US012100976B2

(12) United States Patent
Else et al.

(10) Patent No.: US 12,100,976 B2
(45) Date of Patent: Sep. 24, 2024

(54) PREMISES SECURITY SYSTEM WITH WIRELESS ENERGY HARVESTING

(71) Applicant: The ADT Security Corporation, Boca Raton, FL (US)

(72) Inventors: Steven Else, Deerfield Beach, FL (US); Jatin Patel, Boca Raton, FL (US)

(73) Assignee: The ADT Security Corporation, Boca Raton, FL (US)

( * ) Notice: Subject to any disclaimer, the term of this patent is extended or adjusted under 35 U.S.C. 154(b) by 0 days.

(21) Appl. No.: 17/992,515

(22) Filed: Nov. 22, 2022

(65) Prior Publication Data

US 2024/0169059 A1    May 23, 2024

(51) Int. Cl.
| | | |
|---|---|---|
| H02J 7/00 | (2006.01) | |
| G08B 13/00 | (2006.01) | |
| G08B 13/22 | (2006.01) | |
| G08B 21/00 | (2006.01) | |

(52) U.S. Cl.
CPC ................ *H02J 7/00* (2013.01); *H02J 7/007* (2013.01); *G08B 13/00* (2013.01); *G08B 13/22* (2013.01); *G08B 21/00* (2013.01)

(58) Field of Classification Search
CPC .... H02J 50/12; H02J 50/80; H02J 7/00; H02J 7/007; H02J 7/025; H02J 17/00; H04N 5/23; H04N 5/232; H04N 5/23241; G08B 13/14; G08B 13/196; G08B 13/19636; G01S 7/00; G01S 7/006; G01S 7/41; G01S 7/415; G01S 13/00; G01S 13/003; G01S 13/56

See application file for complete search history.

(56) References Cited

U.S. PATENT DOCUMENTS

| | | | |
|---|---|---|---|
| 7,400,252 | B2 | 7/2008 | Cohen |
| 8,024,012 | B2 | 9/2011 | Clevenger et al. |
| 9,642,089 | B2 | 5/2017 | Sharma et al. |
| 10,111,173 | B2 | 10/2018 | Alpman et al. |
| 10,128,893 | B2 | 11/2018 | Sharma et al. |
| 10,140,820 | B1 | 11/2018 | Zalewski et al. |
| 10,158,401 | B2 | 12/2018 | Hull et al. |
| 10,252,799 | B2 | 4/2019 | Mottale |
| 10,346,603 | B2 | 7/2019 | Myers et al. |
| 10,924,144 | B2 | 2/2021 | Zalewski et al. |
| 11,129,129 | B2 | 9/2021 | Siddiqui |
| 11,171,503 | B2 | 11/2021 | Langenberg et al. |

(Continued)

OTHER PUBLICATIONS

NPL Search {May 3, 2023}.*

*Primary Examiner* — Van T Trieu
(74) *Attorney, Agent, or Firm* — Weisberg I.P. Law, P.A.

(57) ABSTRACT

A method, system and device(s) are disclosed. According to some embodiments, a premises security system is provided. The premises security system includes a premises device including a sensor for detecting a premises security event, an energy storage element in electrical communication with the sensor, a radio frequency (RF) antenna configured to receive RF energy from an RF source, and energy harvesting circuitry in electrical communication with the RF antenna and the energy storage element, and processing circuitry configured to cause transmission of sensor data indicating the premises security event to a security control device, and where the security control device is configured to receive the sensor data, and perform an action based at least on the sensor data.

18 Claims, 5 Drawing Sheets

(56) References Cited

U.S. PATENT DOCUMENTS

| | | | |
|---|---|---|---|
| 11,171,512 B2* | 11/2021 | Kim | H02J 50/12 |
| 11,362,549 B2* | 6/2022 | Chowdhury | H02J 50/80 |
| 2009/0152954 A1 | 6/2009 | Le et al. | |
| 2014/0327553 A1 | 11/2014 | Whitaker et al. | |
| 2015/0068069 A1* | 3/2015 | Tran | A43B 13/183 340/693.1 |
| 2019/0044392 A1* | 2/2019 | Chowdhury | H02J 50/12 |
| 2020/0160670 A1 | 5/2020 | Zalewski et al. | |
| 2020/0167631 A1 | 5/2020 | Rezgui | |
| 2020/0364967 A1 | 11/2020 | Spice | |
| 2020/0408875 A1* | 12/2020 | Mai | G01S 7/006 |
| 2021/0166224 A1 | 6/2021 | Mars et al. | |
| 2021/0194528 A1 | 6/2021 | Zalewski et al. | |
| 2021/0194691 A1 | 6/2021 | Mars et al. | |
| 2021/0219231 A1 | 7/2021 | Rollet | |

* cited by examiner

PREMISES SECURITY SYSTEM WITH WIRELESS ENERGY HARVESTING

FIELD

The present disclosure relates to wireless communications, and in particular, to energy harvesting premises devices in a premises security system.

BACKGROUND

Existing premises security systems use various premises devices (e.g., sensors) to monitor a premises for an alarm event. Such alarm events may include a fire event, break-in event, etc. These premises devices often rely on battery power where one or more batteries are used to supply voltage to the premises device to allow the premises device to function as intended. These battery powered premises devices provide various advantages over hard-wired premises devices as the battery powered premises device can be mounted in and around the premises at locations that do not have a power supply and/or where running a power line to the device is not practical. Further, running wires to power the hard-wired premises devices disadvantageously consumes limited technician resources and increases the installation cost.

BRIEF DESCRIPTION OF THE DRAWINGS

A more complete understanding of the present embodiments, and the attendant advantages and features thereof, will be more readily understood by reference to the following detailed description when considered in conjunction with the accompanying drawings wherein.

DETAILED DESCRIPTION

Figure 1:
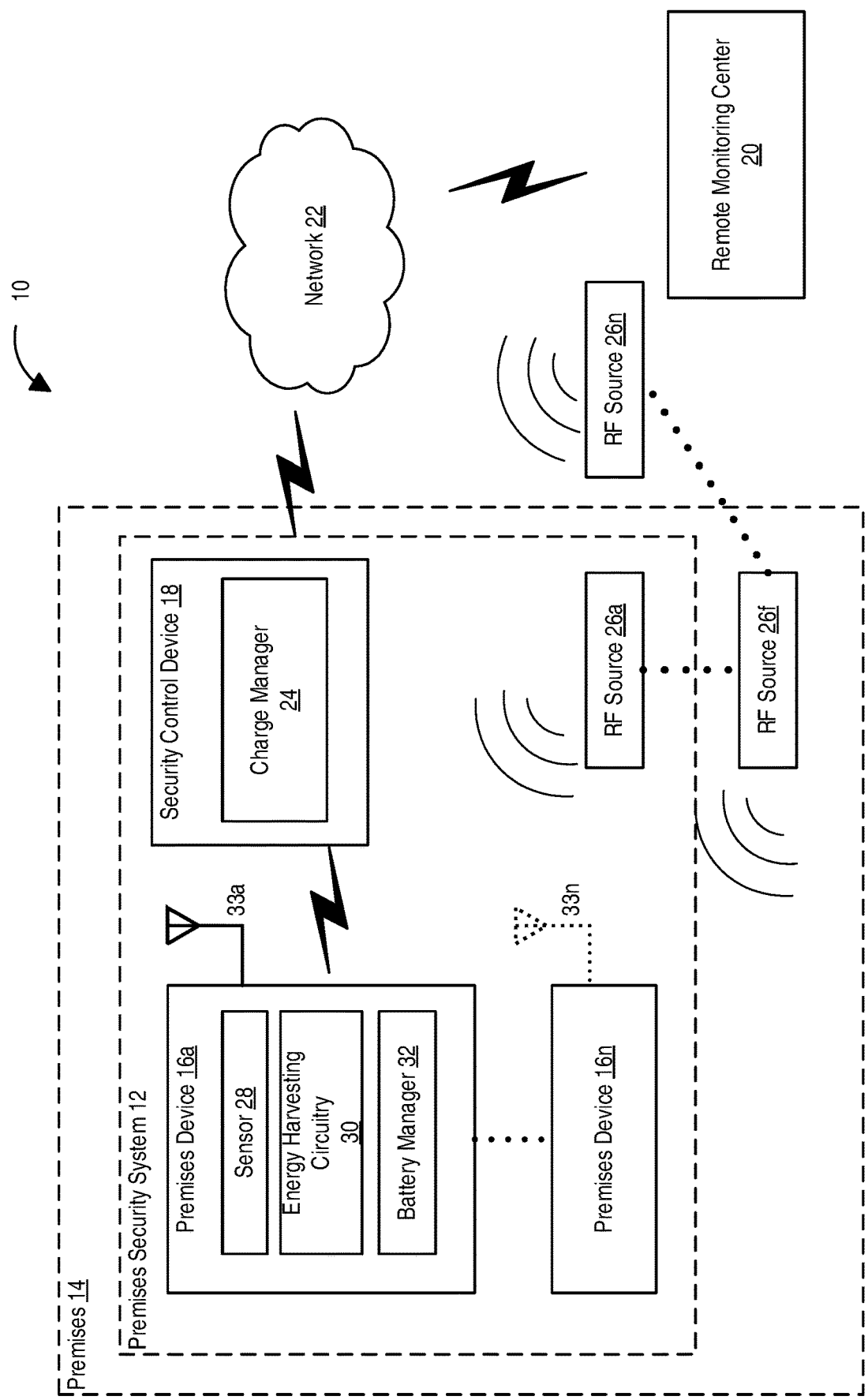
FIG. 1 is a schematic diagram of an example system according to some embodiments of the present disclosure.

Existing battery powered premises devices often require battery replacement every year or, in some scenarios, every 3-5 years if a power management system is incorporated into the battery powered premises device. However, the recurring cost of battery replacement every 3-5 years may be high as the time period between replacements is too short.

The instant disclosure solves one or more problems with existing systems by potentially extending battery life up to 20 years versus typical battery life of 3-5 years, or in some cases, past the useful life of the battery powered premises device as the sensor in may wear before battery replacement is required. For example, one recommendation for battery-powered smoke alarms is to replace smoke alarms every 10 years due to common sensor wear. Using the teachings described herein, the initially installed battery may last the life of the smoke alarm, thereby reducing the overall cost of various battery powered premises devices installed in and around a premises.

Before describing in detail example embodiments, it is noted that the embodiments may reside in combinations of apparatus components and processing steps related to energy harvesting premises device in a premises security system. Accordingly, components have been represented where appropriate by conventional symbols in the drawings, focusing on only those specific details that facilitate understanding the embodiments so as not to obscure the disclosure with details that will be readily apparent to those of ordinary skill in the art having the benefit of the description herein. Like numbers refer to like elements throughout the description.

As used herein, relational terms, such as "first" and "second," "top" and "bottom," and the like, may be used solely to distinguish one entity or element from another entity or element without necessarily requiring or implying any physical or logical relationship or order between such entities or elements. The terminology used herein is for the purpose of describing particular embodiments only and is not intended to be limiting of the concepts described herein. As used herein, the singular forms "a," "an" and "the" are intended to include the plural forms as well, unless the context clearly indicates otherwise. It will be further understood that the terms "comprises," "comprising," "includes" and/or "including" when used herein, specify the presence of stated features, integers, steps, operations, elements, and/or components, but do not preclude the presence or addition of one or more other features, integers, steps, operations, elements, components, and/or groups thereof.

In embodiments described herein, the joining term, "in communication with" and the like, may be used to indicate electrical or data communication, which may be accomplished by physical contact, induction, electromagnetic radiation, radio signaling, infrared signaling or optical signaling, for example. One having ordinary skill in the art will appreciate that multiple components may interoperate and modifications and variations are possible of achieving the electrical and data communication.

In some embodiments described herein, the term "coupled," "connected," and the like, may be used herein to indicate a connection, although not necessarily directly, and may include wired and/or wireless connections.

In some embodiments, the general description elements in the form of "one of A and B" corresponds to A or B. In some embodiments, at least one of A and B corresponds to A, B or AB, or to one or more of A and B. In some embodiments, at least one of A, B and C corresponds to one or more of A, B and C, and/or A, B, C or a combination thereof.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

Some embodiments provide energy harvesting premises devices in a premises security system. Referring now to the drawing figures, in which like elements are referred to by like reference numerals, there is shown in FIG. 1 an example system for energy harvesting and management in a premises security system and designated generally as "10." System 10 includes a premises security system 12 for monitoring premises 14, and one or more premises devices 16a-16n (collectively referred to as "premises device 16") located in and/or around premises 14. Premises device 16 may include one or more battery powered premises devices 16, hardwired premises devices 16, etc., although the teachings herein are applicable to any premises device 16 in a premises security system that has/uses a rechargeable battery.

Premises security system 12 includes security control device 18 in communication with premises device 16 for receiving premises (e.g., sensor) data from premises device 16, and in communication with remote monitoring center 20 via one or more networks 22. Security control device 18 may be configured to communicate with any component of system 10 and/or perform or trigger at least one premises security action associated with any component of system 10. Further, in one or more embodiments, security control device 18 includes charge manager 24 that is configured to perform one or more security control device 18 functions as described herein such as with respect to energy harvesting management. For example, charge manager 24 may be configured to trigger (e.g., enable, disable) one or more radio frequency (RF) sources 26a-n (collectively referred to as RF source 26) based at least on, for example, a status and/or state of the premises security system 12. RF source 26 is configured to emit, transmit, and/or provide RF signals that are usable by premises device 16 to charge and/or power premises device 16, as described herein. In one or more embodiments, one or more RF sources 26 may be controllable by security control device 18. In one or more embodiments, one or more RF sources 26 (e.g., wireless router, wireless gateway, etc.) are not controllable by security control device 18 as these one or more RF sources 26 may be operated independently of premises security system 12 and/or at the control of the user and/or entity other than the premises security system 12.

Although premises security system 12 is shown as comprising premises devices 16a-16n, premises security system 12 is not limited to comprising only premises devices 16a and 16n and may include additional premises devices 16. Any premises device 16 can be in simultaneous communication and/or configured to communicate separately with more than one other premises device 16 and/or other premises security system 12 and/or other system 10. Communication between components and/or devices of system 10 may be direct communication and/or via one or more networks (not shown). Although premises device 16 is included in the premises security system 12, premises device 16 is not limited to being included in the premises security system 12 and/or system 10 and may reside standing alone, as part of another system, or in any other manner.

Further, each premises device 16 may include one or more of sensors 28. For example, the types of sensors 28 may include various life safety related sensors such as motion sensors (e.g., IR transmitter and receiver), fire sensors, carbon monoxide sensors (e.g., CO-smoke combo sensor), glass break sensor (e.g., sound sensor), door window sensor (e.g., magnetic sensor), flooding sensors and contact sensors, among other sensor types that are known in the art. Premises device 16 may include one or more control devices such as, for example, one or more lifestyle (e.g., home automation) related devices configured to adjust at least one premises setting such as lighting, temperature, energy usage, door lock and power settings, among other settings associated with the premises or devices on the premises. Image capture devices may include digital cameras and/or video cameras, among other image capture devices.

Further, one or more premises devices 16 may include energy harvesting circuitry 30 for harvesting energy. In one or more embodiments, energy harvesting circuitry 30 may be configured to covert RF energy, received by RF antenna 33, to energy usable by the premises device 16 and/or storable by an energy storage element (e.g., battery, supercapacitor, etc.) of the premises device 16. In one or more embodiments, RF antenna 33 is configured to receive RF energy through inductance. Additional details of energy harvesting circuitry 30 are discussed with respect to FIG. 3 below. In one or more embodiments, premises device 16 includes battery manager 32 that is configured to perform one or more premises device 16 functions as described herein such as with respect to battery power management, battery power reporting to security control device 18, etc.

Remote monitoring center 20 may be capable of performing certain monitoring, configuration and/or control functions associated with system 10. For example, with respect to fire and carbon monoxide detectors/sensors, sensor data/ alarm event data/etc. may include carbon monoxide readings, smoke detection readings, sensor location and time of readings, among other information related to these detectors that may be communicated with remote monitoring center 20. In another example, with respect to a door contact detector, monitoring data may include information regarding sensor location and time of detection, among other data related to the door contact detection that may be communicated with remote monitoring center 20.

Alarm event data from the premises devices 16 may be used by the remote monitoring center 20 for performing various safety response processes, including notifying the owner of the premises, determining whether an actual alarm event is occurring at the premises, and notifying any appropriate response agency (e.g., police, fire, emergency response, other interested parties such as premises owners, etc.).

Figure 2:
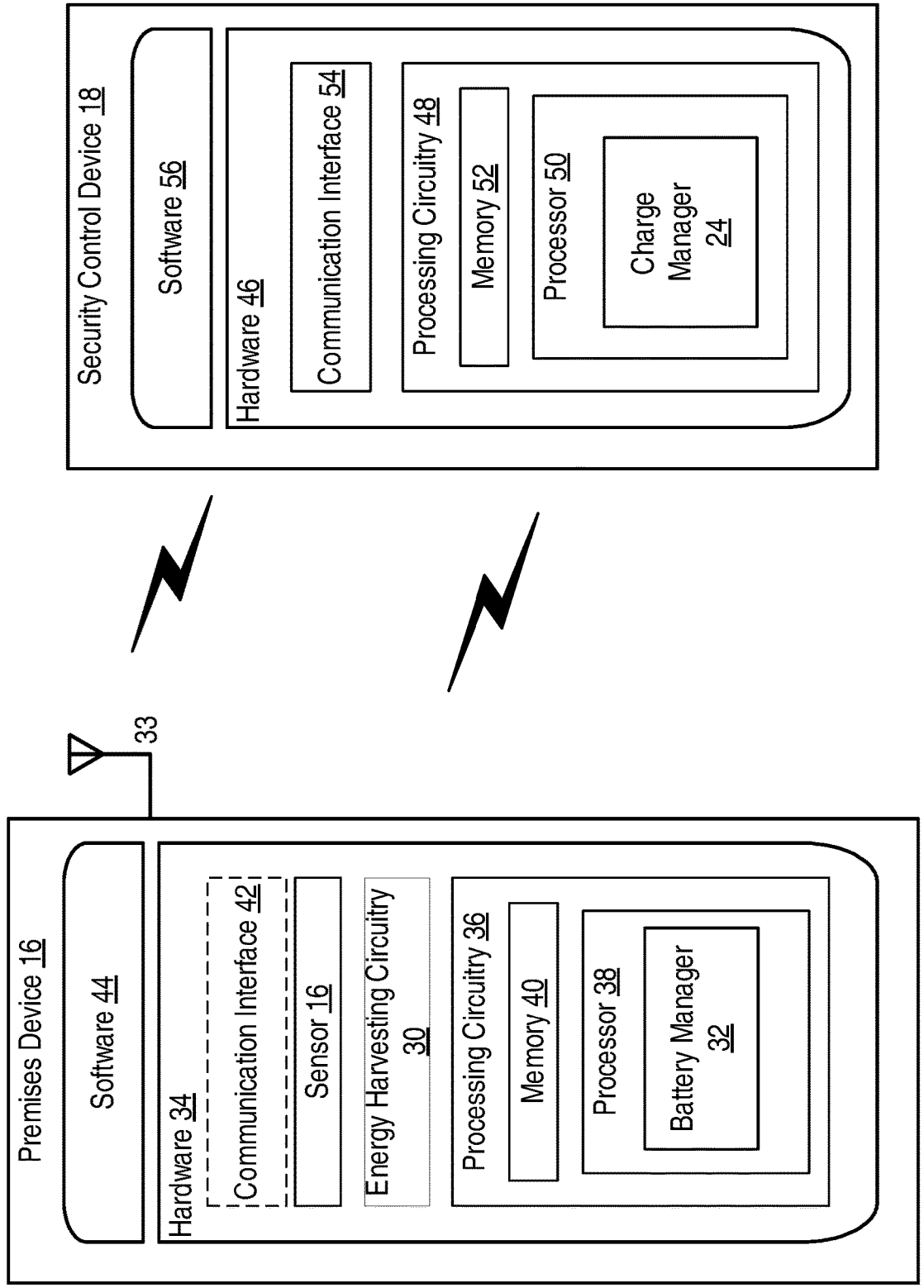
FIG. 2 is a block diagram of several devices of the system according to some embodiments of the present disclosure.

Example implementations, in accordance with an embodiment, of system 10 discussed in the preceding paragraphs will now be described with reference to FIG. 2. The system 10 includes a premises device 16 including hardware 34. The hardware 34 may include processing circuitry 36. The processing circuitry 36 may include a processor 38 and a memory 40. In particular, in addition to or instead of a processor, such as a central processing unit, and memory, the processing circuitry 36 may comprise integrated circuitry for processing and/or control, e.g., one or more processors and/or processor cores and/or field programmable gate arrays (FPGAs) and/or application specific integrated circuits (ASICs) adapted to execute instructions. The processor 38 may be configured to access (e.g., write to and/or read from) the memory 40, which may comprise any kind of volatile and/or nonvolatile memory, e.g., cache and/or buffer memory and/or random access memory (RAM) and/or read-only memory (ROM) and/or optical memory and/or erasable programmable read-only memory (EPROM). Further, memory 40 may be configured as a storage device.

Hardware 34 of premises device 16 may include communication interface 42 enabling it to communicate directly/ indirectly with any component or device of system 10. For example, communication interface 42 may be configured for setting up and maintaining at least a wireless or wired connection with any component/device of system 10 such as security control device 18. The communication interface 42 may be formed as or may include, for example, one or more RF transmitters, one or more RF receivers, and/or one or more RF transceivers. In one or more embodiments, communication interface 42 may be separate from energy harvesting circuitry 30 such that communication interface 42 is configured to perform bi-direction or unidirectional communication with security control device 18 while energy harvesting circuitry 30 is configured to separately harvest RF energy via RF antenna 33. In one or more embodiments, energy harvesting circuitry 30 may be part of communication interface 42 such that communication interface 42 is configured to perform bi-direction or unidirectional communication with security control device 18 and harvest RF energy via RF antenna 33. Energy harvesting circuitry 30 is described in more detail with respect to FIG. 3.

Premises device 16 further has software 44 stored internally in, for example, memory 40, or stored in external memory (e.g., database, storage array, network storage device, etc.) accessible by the premises device 16 via an external connection. Software 44 may include any software or program configured to perform the steps/processes of the present disclosure.

The processing circuitry 36 may be configured to control any of methods and/or processes described herein and/or to cause such methods, and/or processes to be performed, e.g., by premises device 16. Processor 38 corresponds to one or more processors 38 for performing premises device 16 functions described herein. The memory 40 is configured to store data and/or files and/or encryption elements, e.g., security tokens or keys, and/or programmatic software code and/or other information described herein. In some embodiments, the software 44 may include instructions that, when executed by the processor 38 and/or processing circuitry 36, causes the processor 38 and/or processing circuitry 36 to perform the processes described herein with respect to premises devices 16. For example, processing circuitry 36 of the premises device 16 may include battery manager 32 which may be configured to perform one or more premises device 16 function as described herein such as with respect to one or more of battery power management, energy harvesting management and reporting battery related information to security control device 18. For example, battery manager 32 may be configured to adapt voltage output of energy harvesting circuitry 30 to power the self-powered premises device 16 (i.e., battery powered premises device 16).

The system 10 further includes security control device 18 including hardware 46. The hardware 46 may include processing circuitry 48. The processing circuitry 48 may include a processor 50 and a memory 52. In particular, in addition to or instead of a processor, such as a central processing unit, and memory, the processing circuitry 48 may comprise integrated circuitry for processing and/or control, e.g., one or more processors and/or processor cores and/or FPGAs and/or ASICs adapted to execute instructions. The processor 50 may be configured to access (e.g., write to and/or read from) the memory 52, which may comprise any kind of volatile and/or nonvolatile memory, e.g., cache and/or buffer memory, RAM, ROM, optical memory, and/or EPROM. Further, memory 52 may be configured as a storage device.

Hardware 46 of security control device 18 may include communication interface 54 enabling it to communicate directly/indirectly with any component/device of system 10. For example, communication interface 54 may be configured for setting up and maintaining at least a wireless or wired connection with any component/device of system 10 such as premises device 16 and/or remote monitoring center 20. The communication interface 54 may be formed as or may include, for example, one or more RF transmitters, one or more RF receivers, and/or one or more RF transceivers. In one or more embodiments, security control device 18 may act as RF source 26.

Security control device 18 further has software 56 (which may include software applications) stored internally in, for example, memory 52, or stored in external memory (e.g., database, storage array, network storage device, etc.) accessible by security control device 18 via an external connection. Software 56 may include any software or program configured to perform the steps or processes of the present disclosure, e.g., providing an interface for a user to provide an input to the security control device 18 and/or receive an output from the security control device 18.

The processing circuitry 48 may be configured to control any of methods and/or processes described herein and/or to cause such methods, and/or processes to be performed, e.g., by security control device 18. Processor 50 corresponds to one or more processors 50 for performing security control device 18 functions described herein. The memory 52 is configured to store data and/or files and/or encryption elements, e.g., security tokens or keys, and/or programmatic software code and/or other information described herein. In some embodiments, the software 56 may include instructions that, when executed by the processor 50 and/or processing circuitry 48, causes the processor 50 and/or processing circuitry 48 to perform the processes described herein with respect to security control device 18. For example, processing circuitry 48 of the security control device 18 may include charge manager 24 which may be configured to perform one or more security control device 18 functions described herein such as with respect to managing and/or communicating with at least one RF source 26 that is configured to provide RF energy to premises device 16 for energy harvesting.

Figure 3:
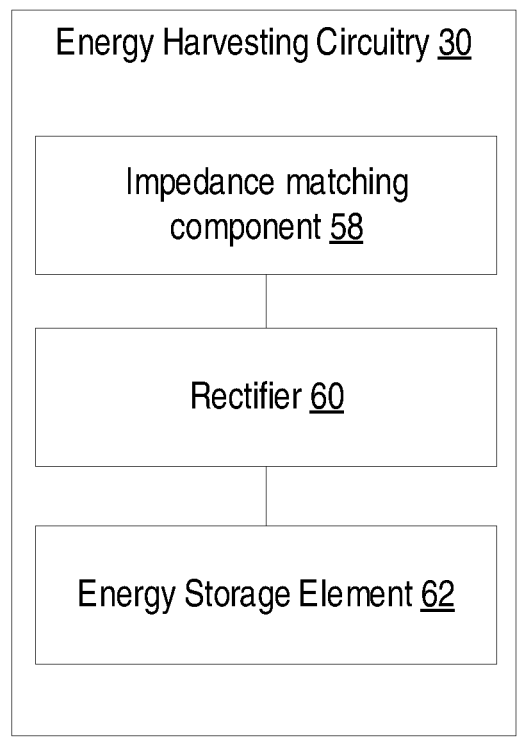
FIG. 3 is a block diagram of energy harvesting circuitry according to some embodiment of the present disclosure.

FIG. 3 is a block diagram of energy harvesting circuitry 30 according to one or more embodiments of the present disclosure. Energy harvesting circuitry 30 includes impedance matching component 58 that is configured to convert radio frequency energy received from RF antenna 33 into a voltage (e.g., output voltage). Rectifier 60 is configured to convert the energy received from the RF antenna to a direct current (DC) voltage and to trickle charge (e.g., charge at a predefined rate) or charge an energy storage element at premises device 16. The energy storage element may be a battery (e.g., lithium battery), super-capacitor, etc. In one or more embodiments, the output voltage of the rectifier 60 is sufficient to at least temporarily maintain a predefined charging voltage to the energy storage element. For example, the output voltage of the rectifier may be configured to hold a charge voltage of 3.3V to the battery.

Figure 4:
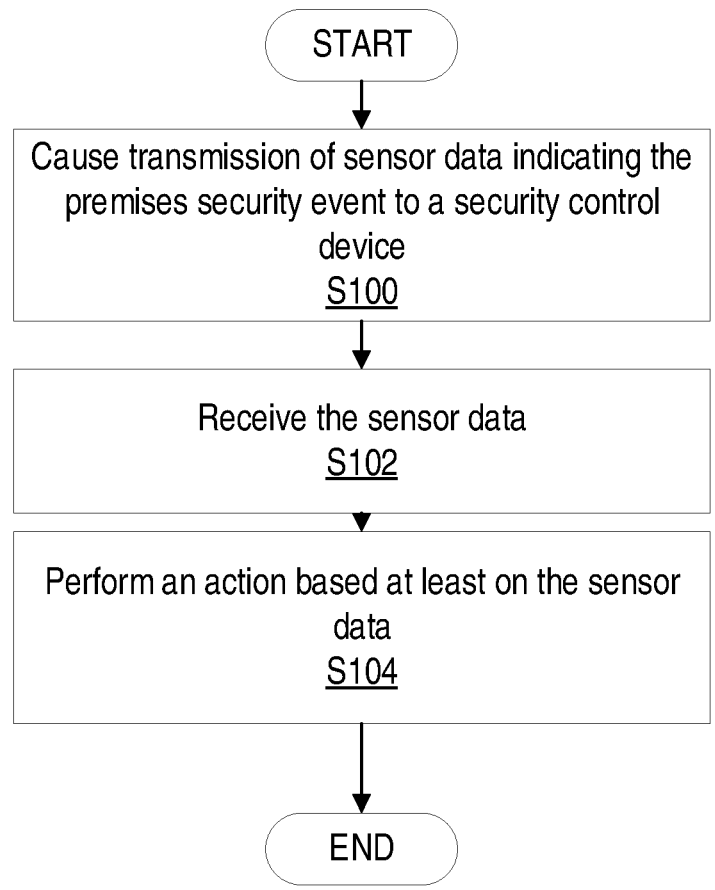
FIG. 4 is a flowchart of an example process in the system according to some embodiments of the present disclosure.

FIG. 4 is a flowchart of an example process in a premises security system 12 according to one or more embodiments of the present disclosure. One or more blocks described herein may be performed by one or more elements of premises security system 12 such as by one or more of processing circuitry 36 (including the battery manager 32), processing circuitry 48 (including charge manager 24), processor 38, processor 50, etc. The premises security system 12 includes a premises device 16 including a sensor 28 for detecting a premises security event, an energy storage element 62 in electrical communication with the sensor 28 where the energy storage element 62 is configured to store energy for powering the sensor 28, RF antenna 33 that is configured to receive RF energy from an RF source 26, and energy harvesting circuitry 30 in electrical communication with the RF antenna 33 and the energy storage element 62 where the energy harvesting circuitry 30 is configured to convert the RF energy into a voltage for the energy storage element 62. The premises device 16 is configured cause (Block S100) transmission of sensor data indicating the premises security event to a security control device 18. The security control device 18 is configured to receive (Block S102) the sensor data. The security control device 18 is configured to perform (Block S104) an action based at least on the sensor data.

According to one or more embodiments, the energy harvesting circuitry 30 further comprises an impedance matching component 58 that is configured to convert the RF energy into a first voltage, and a rectifier 60 that is configured to convert the first voltage into a direct current (DC) voltage for charging the energy storage element 62. According to one or more embodiments, the processing circuitry 48 of the security control device 18 is further configured to determine a state of the premises security system 12, and cause the RF source 26 to start or stop emitting RF energy to the RF antenna 33 based at least in part on the state of the premises security system 12.

According to one or more embodiments, the processing circuitry 48 of the security control device 18 is further configured to cause the RF source to emit RF energy based at least on the state of the premises security system 12 corresponding to an armed state. According to one or more embodiments, the processing circuitry 48 of the security control device 18 is further configured to cause the RF source 26 to stop emitting RF energy based at least on the state of the premises security system 12 corresponding to a disarmed state. According to one or more embodiments, the processing circuitry 48 of the security control device is further configured to cause the RF source 26 to emit RF energy based at least on the state of the premises security system 12 corresponding to an armed state, and the sensor data indicating the premises security event.

According to one or more embodiments, the RF energy is a predefined RF signal that is configured to be data-less. According to one or more embodiments, the RF source 26 is not controllable by the security control device 18. According to one or more embodiments, the RF source 26 is a wireless router, a wireless gateway, a mobile device, or a mobile base station. According to one or more embodiments, the sensor 28 is a carbon monoxide sensor, a smoke sensor, a motion sensor, a glass break sensor, a window sensor, or a door sensor. According to one or more embodiments, the action comprises triggering an alarm at the premises 14 and transmitting a notification to a remote monitoring center 20.

Figure 5:
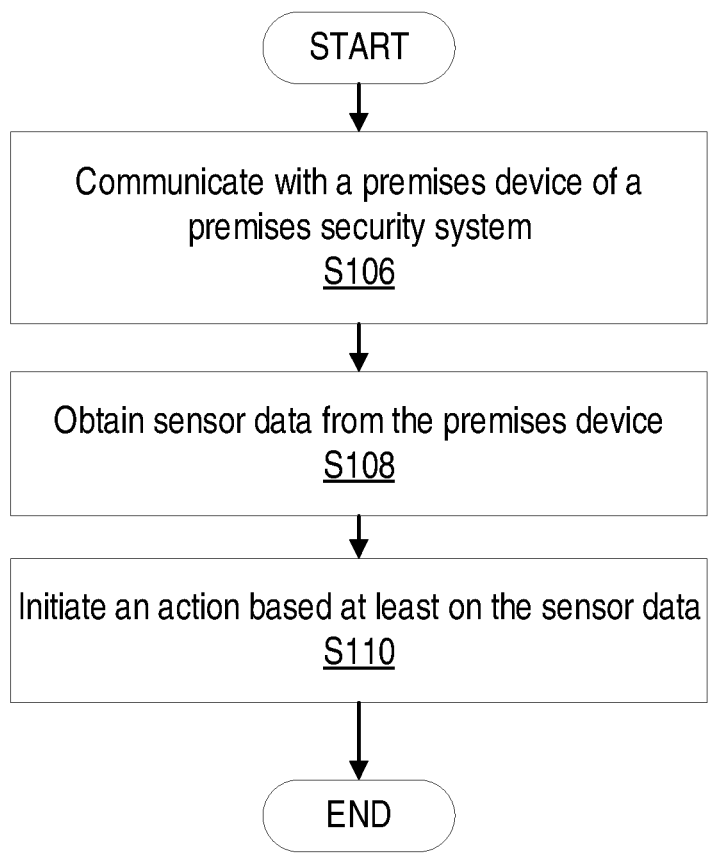
FIG. 5 is a flowchart of an example process in the security control device according to some embodiments of the present disclosure.

FIG. 5 is a flowchart of an example process in a security control device 18 according to some embodiments of the present disclosure. One or more blocks described herein may be performed by one or more elements of security control device 18 such as by one or more of processing circuitry 48 (including the charge manager 24), processor 50, communication interface 54, etc. For example, the security control device 18 includes a processor 50 and memory 52 storing a plurality of computer instructions. Executing the plurality of computer instructions by the processor 50, cause the processor 50 to communicate (Block S106) with a premises device 16 of a premises security system 12 such as via communication interface 54. The premises device 16 comprises a sensor 28 for detecting a premises security event, and the premises device 16 further comprises an energy storage element 62 in electrical communication with the sensor 28 where the energy storage element 62 is configured to store energy for powering the sensor 28. The premises device 16 further comprises an RF antenna 33 configured to receive RF energy from an RF source 26, and energy harvesting circuitry 30 in electrical communication with the RF antenna 33 and energy storage element 62 where the energy harvesting circuitry 30 is configured to convert the RF energy into a voltage for the energy storage element 62. Further, executing the plurality of computer instructions by the processor 50, cause the processor 50 to obtain (Block S108) sensor data from the premises device 16. Further, executing the plurality of computer instructions by the processor 50, cause the processor 50 to initiate (Block S110) an action based at least on the sensor data.

According to one or more embodiments, the plurality of computer instructions are further configured to cause the processor 50 to determine a state of the premises security system 12, and cause the RF source 26 to start or stop emitting RF energy to the RF antenna 33 based at least on the state of the premises security system 12.

According to one or more embodiments, the plurality of computer instructions are further configured to cause the processor 50 to cause the RF source 26 to emit RF energy based at least on the state of the premises security system 12 corresponding to an armed state.

According to one or more embodiments, the plurality of computer instructions are further configured to cause the processor 50 to cause the RF source 26 to stop emitting RF energy based at least on the state of the premises security system 12 corresponding to a disarmed state.

According to one or more embodiments, the plurality of computer instructions are further configured to cause the processor 50 to cause the RF source 26 to emit RF energy based at least on the state of the premises security system 12 corresponding to an armed state, and the sensor data indicates the premises security event. According to one or more embodiments, the RF energy is a predefined RF signal that is configured to be data-less. According to one or more embodiments, the RF source 26 is not controllable by the security control device 18.

According to one or more embodiments, the RF source 26 is a wireless router, a wireless gateway, a mobile device or a mobile base station. According to one or more embodiments, the action comprises triggering an alarm at the premises 14 and transmitting a notification to a remote monitoring center 20.

According to one or more embodiments, the processing circuitry 48 is configured to cause the RF source 26 to start radiating RF energy based on the state of the premises security system 12 corresponding to an armed state. According to one or more embodiments, the processing circuitry 48 is configured to cause the RF source 26 to stop radiating RF energy based on the determined state of the premises security system 12 corresponding to a disarmed state. According to one or more embodiments, the processing circuitry 48 is configured to cause the RF source 26 to start radiating RF energy based on whether the premises security system 12 corresponds to an armed state and the sensor data indicating the premises security event.

According to one or more embodiments, the RF source 26 and/or other RF sources 26 are controllable by security control device 18. For example, security control device 18 is configured to control one or more RF signal characteristics of an RF signal emitted by RF source 26. In one example, the RF source 26 is a variable power RF source where security control device 18 is configured to dynamically adjust a magnitude of the RF signal such that the security control device 18 is able to increase the rate of charge if an event is detected (e.g., alarm event) and/or maintain the RF signal at lower power to maintain a sensor charge. Further, in one or more embodiments, a variable power RF source 26 is used when the RF source 26 has access to nominal power or line voltage, e.g., 120 AC, but ramps down or cuts off power altogether if line power is out.

According to one or more embodiments, the security control device 18 may configure the magnitude of the emitted RF signal based on a distance of the RF source 26 from the premises device 16. For example, security control device 18 may be configured to cause (e.g., via signaling) the RF source 26 to emit the RF signal with a particular magnitude based on the distance of the premises device 16 from the RF source 26. The distance between premises device 16 and RF source 26 may be determined by security control device 18 based on signals received from premises device 16 and RF source 26, e.g., security control device 18 extrapolates the distance and direction from the received signals and/or powers. Further, the RF source 26 can be configured to implement beamforming to concentrate the RF signal power on one or more premises devices 16.

According to one or more embodiments, the security control device 18 is configured to prioritize a subset of premises devices 16 over the remaining premises devices 16. For example, the RF source 26 is configured to operate using a backup battery energy supply during power loss at premises 14. In this situation, security control device 18 (which may also be used as a backup battery energy supply) enables the RF source 26 only when a premises device 16 (e.g., higher priority premises devices 16 such as life safety premises devices 16) indicates that it is running out of power (i.e., battery power is below a threshold such as a battery warning threshold), irrespective if the lower priority (e.g., lifestyle premises devices 16) have battery power that is below a warning threshold. In an example using beamforming, security control device 18 is configured to enable and configure the RF source 26 to beamform one or more RF beams to cover the subset of premises devices 16 (i.e., higher priority premises devices 16 such as life safety premises devices 16) such as to focus more energy toward the subset of premises devices 16. Therefore, security control device 18 may prioritize RF power and/or direct RF power to higher priority premises devices 16 during situations when the RF source 26 has a limited time to operate.

According to one or more embodiments, the security control device 18 is configured to monitor a state of charge of the premises device 16 and cause at least one RF source 26 to radiate RF energy when the premises device 16's charge falls below a predetermined value and/or when more than one sensor battery falls below a threshold. An indication of the state of charge of the premises device 16 may be communicated to the security control device 18 along with sensor data and/or separate from the sensor data transmission.

The concepts described herein may be embodied as methods, data processing systems, computer program products and/or computer storage media storing executable computer programs. Accordingly, the concepts described herein may take the form of an entirely hardware embodiment, an entirely software embodiment, or an embodiment combining software and hardware aspects, which are all generally referred to herein as a "circuit" or "module." Any process, step, action and/or functionality described herein may be performed by, and/or associated with, a corresponding module, which may be implemented in software and/or firmware and/or hardware. Furthermore, the disclosure may take the form of a computer program product on a tangible computer usable storage medium having computer program code embodied in the medium that can be executed by a computer. Any suitable tangible computer readable medium may be utilized including hard disks, CD-ROMs, electronic storage devices, optical storage devices, or magnetic storage devices.

Some embodiments are described herein with reference to flowchart illustrations and/or block diagrams of methods, systems and computer program products. Each block of the flowchart illustrations and/or block diagrams, and combinations of blocks in the flowchart illustrations and/or block diagrams, can be implemented by computer program instructions. These computer program instructions may be provided to a processor of a general purpose computer (to thereby create a special purpose computer), special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable memory or storage medium that can direct a computer or other programmable data processing apparatus to function in a particular manner, such that the instructions stored in the computer readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

The functions/acts noted in the blocks may occur out of the order noted in the operational illustrations. For example, two blocks shown in succession may in fact be executed substantially concurrently or the blocks may sometimes be executed in the reverse order, depending upon the functionality/acts involved. Although some of the diagrams include arrows on communication paths to show a primary direction of communication, communication may occur in the opposite direction to the depicted arrows.

Computer program code for carrying out operations of the concepts described herein may be written in an object-oriented programming language such as Python, Java® or C++. However, the computer program code for carrying out operations of the disclosure may also be written in conventional procedural programming languages, such as the "C" programming language. The program code may execute entirely on the user's computer, partly on the end device, as a stand-alone software package, partly on the end device and partly on a remote computer or entirely on the remote computer. In the latter scenario, the remote computer may be connected to the user's computer through a local area network (LAN) or a wide area network (WAN), or the connection may be made to an external computer (for example, through the Internet using an Internet Service Provider).

Many different embodiments have been disclosed herein, in connection with the above description and the drawings. It would be unduly repetitious and obfuscating to literally describe and illustrate every combination and subcombination of these embodiments. Accordingly, all embodiments can be combined in any way and/or combination, and the present specification, including the drawings, shall be construed to constitute a complete written description of all combinations and subcombinations of the embodiments described herein, and of the manner and process of making and using them, and shall support claims to any such combination or subcombination.

It will be appreciated by persons skilled in the art that the embodiments described herein are not limited to what has been particularly shown and described herein above. In addition, unless mention was made above to the contrary, it should be noted that all of the accompanying drawings are not to scale. A variety of modifications and variations are possible in light of the above teachings without departing from the scope of the following claims.

What is claimed is:

1. A premises security system for monitoring a premises, comprising:
    a premises device; and
    a security control device;
    wherein the premises device comprises:
        a sensor for detecting a premises security event;
        an energy storage element in electrical communication with the sensor, the energy storage element configured to store energy for powering the sensor;
        a radio frequency (RF) antenna configured to receive RF energy from an RF source;
        energy harvesting circuitry in electrical communication with the RF antenna and the energy storage element, the energy harvesting circuitry configured to convert the RF energy into a voltage for the energy storage element; and
        processing circuitry configured to cause transmission of sensor data indicating the premises security event to a security control device; and
    wherein the security control device comprises processing circuitry configured to:
        determine a state of the premises security system, the state being one of armed or disarmed;
        cause the RF source to start or stop emitting RF energy based at least in part on the state of the premises security system;
        receive the sensor data;
        in response to the indication of the premises security event, cause the RF source to adjust a magnitude of the RF energy emitted from the RF source to increase a rate of charge of the premises device; and
        perform an action based at least on the sensor data.

2. The premises security system of claim 1, wherein the energy harvesting circuitry further comprises:
    an impedance matching component that is configured to convert the RF energy into a first voltage; and
    a rectifier that is configured to convert the first voltage into a direct current (DC) voltage for charging the energy storage element.

3. The premises security system of claim 1, wherein the processing circuitry of the security control device is further configured to cause the RF source to emit RF energy based at least on a state of the premises security system corresponding to an armed state.

4. The premises security system of claim 1, wherein the processing circuitry of the security control device is further configured to cause the RF source to stop emitting RF energy based at least on a state of the premises security system corresponding to a disarmed state.

5. The premises security system of claim 1, wherein the processing circuitry of the security control device is further configured to cause the RF source to emit RF energy based at least on:
    a state of the premises security system corresponding to an armed state; and
    the sensor data indicating the premises security event.

6. The premises security system of claim 1, wherein the RF energy is a predefined RF signal that is configured to be data-less.

7. The premises security system of claim 1, wherein the RF source is a wireless router, a wireless gateway, a mobile device, or a mobile base station.

8. The premises security system of claim 1, wherein the sensor is a carbon monoxide sensor, a smoke sensor, a motion sensor, a glass break sensor, a window sensor, or a door sensor.

9. The premises security system of claim 1, wherein the action comprises triggering an alarm at the premises and transmitting a notification to a remote monitoring center.

10. A security control device, comprising:
    a processor; and
    memory storing a plurality of computer instructions that, when executed by the processor, cause the processor to:
        communicate with a premises device of a premises security system, the premises device comprising a sensor for detecting a premises security event, the premises device further comprising an energy storage element in electrical communication with the sensor, the energy storage element configured to store energy for powering the sensor, the premises device further comprising an RF antenna configured to receive RF energy from an RF source and energy harvesting circuitry in electrical communication with the RF antenna and energy storage element, the energy harvesting circuitry configured to convert the RF energy into a voltage for the energy storage element;
        determine a state of the premises security system, the state being one of armed or disarmed;
        cause the RF source to start or stop emitting RF energy based at least in part on the state of the premises security system;
        obtain sensor data from the premises device, the sensor data indicating the premises security event;
        in response to the indication of the premises security event, cause the RF source to adjust a magnitude of the RF energy emitted from the RF source to increase a rate of charge of the premises device; and
        initiate an action based at least on the sensor data.

11. The security control device of claim 10, wherein the plurality of computer instructions are further configured to cause the processor to cause the RF source to emit RF energy based at least on a state of the premises security system corresponding to an armed state.

12. The security control device of claim 10, wherein the plurality of computer instructions are further configured to cause the processor to cause the RF source to stop emitting RF energy based at least on a state of the premises security system corresponding to a disarmed state.

13. The security control device of claim 10, wherein the plurality of computer instructions are further configured to cause the processor to cause the RF source to emit RF energy based at least on:
    a state of the premises security system corresponding to an armed state; and
    the sensor data indicating the premises security event.

14. The security control device of claim 10, wherein the RF energy is a predefined RF signal that is configured to be data-less.

15. The security control device of claim 10, wherein the RF source is a wireless router, a wireless gateway, a mobile device or a mobile base station.

16. The security control device of claim 10, wherein the action comprises triggering an alarm at the premises and transmitting a notification to a remote monitoring center.

17. The premises security system of claim 1, wherein the processing circuitry of the security control device is further configured to cause the RF source to dynamically adjust the magnitude of the RF energy emitted from the RF source in response to the indication of the premises security event.

18. The security control device of claim 10, wherein the plurality of computer instructions are further configured to cause the processor to cause the RF source to dynamically adjust the magnitude of the RF energy emitted from the RF source in response to the indication of the premises security event.

* * * * *